US005900445A

United States Patent [19]
Chandler et al.

[11] Patent Number: 5,900,445
[45] Date of Patent: * May 4, 1999

[54] ERASABLE INK COMPOSITION CONTAINING A POLYMER DYE OBTAINED FROM ETHYLENIC MONOMERS AND MARKING INSTRUMENT CONTAINING SAME

[75] Inventors: Wayne A. Chandler, Mauldin; David C. Villiger, Greenville; Aiying Wang, Simpsonville; Jeffery H. Banning, Spartanburg; Barry W. Chadwick, Simpsonville, all of S.C.

[73] Assignee: BIC Corporation, Milford, Conn.

[ * ] Notice: This patent is subject to a terminal disclaimer.

[21] Appl. No.: 08/650,593

[22] Filed: May 20, 1996

Related U.S. Application Data

[63] Continuation of application No. 08/359,568, Dec. 20, 1994, abandoned.

[51] Int. Cl.[6] .................................................. C09D 11/18
[52] U.S. Cl. ........................ 523/161; 524/458; 524/460; 260/DIG. 38; 106/31.23; 106/31.27; 106/31.32; 401/209
[58] Field of Search .................... 523/161; 106/21 A, 106/22 R, 23 R, 23 B; 260/DIG. 38; 524/458, 460; 401/209

[56] References Cited

U.S. PATENT DOCUMENTS

| | | | |
|---|---|---|---|
| 3,875,105 | 4/1975 | Daugherty et al. | 523/161 |
| 3,949,132 | 4/1976 | Seregely et al. | 428/207 |
| 4,059,554 | 11/1977 | Pacansky | 524/486 |
| 4,097,290 | 6/1978 | Muller et al. | 106/30 R |
| 4,137,083 | 1/1979 | Hedrick | 106/20 R |
| 4,212,676 | 7/1980 | Ueda | 106/19 B |
| 4,227,930 | 10/1980 | Lin | 106/19 A |
| 4,239,868 | 12/1980 | Bonnet et al. | 525/279 |
| 4,256,494 | 3/1981 | Yamamoto et al. | 106/22 A |
| 4,329,262 | 5/1982 | Muller | 523/161 |
| 4,329,264 | 5/1982 | Muller | 523/161 |
| 4,349,639 | 9/1982 | Muller | 523/161 |
| 4,357,431 | 11/1982 | Murakami et al. | 523/161 |
| 4,367,966 | 1/1983 | Williams et al. | 401/190 |
| 4,368,076 | 1/1983 | Iijima | 166/22 F |
| 4,379,867 | 4/1983 | Noriaki | 523/161 |
| 4,389,499 | 6/1983 | Riesgraf | 523/161 |
| 4,390,646 | 6/1983 | Ferguson | 523/161 |
| 4,391,927 | 7/1983 | Farmer, III | 523/161 |
| 4,407,985 | 10/1983 | Muller | 523/161 |
| 4,410,643 | 10/1983 | Muller | 523/161 |
| 4,419,464 | 12/1983 | Williams et al. | 523/161 |
| 4,421,660 | 12/1983 | Solc nee Hajna | 252/62.54 |
| 4,441,928 | 4/1984 | Iijima | 106/21 A |
| 4,471,079 | 9/1984 | Enami | 523/161 |
| 4,487,855 | 12/1984 | Shih et al. | 523/201 |
| 4,509,982 | 4/1985 | Iijima | 106/23 B |
| 4,525,216 | 6/1985 | Nakanishi | 106/30 R |
| 4,545,818 | 10/1985 | Inoue et al. | 106/22 F |
| 4,557,618 | 12/1985 | Iwata et al. | 401/34 |
| 4,578,117 | 3/1986 | Nakanishi | 106/20 A |
| 4,596,846 | 6/1986 | Bohne et al. | 524/173 |
| 4,606,769 | 8/1986 | Tanaka et al. | 106/30 R |
| 4,629,748 | 12/1986 | Miyajima et al. | 523/161 |
| 4,671,691 | 6/1987 | Case et al. | 401/142 |
| 4,686,246 | 8/1987 | Gajria | 523/161 |
| 4,687,791 | 8/1987 | Miayjima et al. | 523/161 |
| 4,693,846 | 9/1987 | Piccirilli et al. | 106/29 R |
| 4,721,739 | 1/1988 | Brenneman et al. | 523/161 |
| 4,726,845 | 2/1988 | Thompson et al. | 106/25 A |
| 4,738,725 | 4/1988 | Daugherty et al. | 106/32 |
| 4,758,645 | 7/1988 | Miyazono et al. | 527/311 |
| 4,760,104 | 7/1988 | Miyajima et al. | 523/161 |
| 4,763,371 | 8/1988 | Parton | 8/647 |
| 4,770,706 | 9/1988 | Pietsch | 106/24 R |
| 4,786,198 | 11/1988 | Zgambo | 401/142 |
| 4,789,399 | 12/1988 | Williams et al. | 106/20 R |
| 4,795,794 | 1/1989 | Winnik et al. | 526/259 |
| 4,830,670 | 5/1989 | Danyu | 106/23 B |
| 4,880,432 | 11/1989 | Egan et al. | 8/647 |
| 4,940,628 | 7/1990 | Lin et al. | 428/207 |
| 4,942,185 | 7/1990 | Inoue et al. | 521/54 |
| 4,954,174 | 9/1990 | Imagawa | 106/27 R |
| 4,960,464 | 10/1990 | Chen | 106/19 D |
| 4,971,628 | 11/1990 | Loftin | 106/22 F |
| 4,997,897 | 3/1991 | Melpolder | 526/284 |
| 5,004,763 | 4/1991 | Imagawa | 523/161 |
| 5,009,536 | 4/1991 | Inoue et al. | 401/198 |
| 5,010,125 | 4/1991 | Kruse et al. | 524/308 |
| 5,013,361 | 5/1991 | Case et al. | 106/22 F |
| 5,024,700 | 6/1991 | Britton, Jr. | 106/32 |
| 5,024,898 | 6/1991 | Pitts et al. | 428/511 |
| 5,037,702 | 8/1991 | Pitts et al. | 428/423.7 |
| 5,048,992 | 9/1991 | Loftin | 401/209 |
| 5,055,602 | 10/1991 | Melpolder | 552/238 |
| 5,082,495 | 1/1992 | Iijima | 106/21 A |
| 5,106,881 | 4/1992 | Inoue et al. | 521/54 |
| 5,114,479 | 5/1992 | Keaveney et al. | 106/30 R |
| 5,120,359 | 6/1992 | Uzukawa et al. | 106/20 A |
| 5,124,400 | 6/1992 | Tirpak et al. | 524/591 |
| 5,160,369 | 11/1992 | Parkinson et al. | 106/19 R |
| 5,188,641 | 2/1993 | Parton | 8/647 |
| 5,203,913 | 4/1993 | Yamamoto et al. | 106/22 B |
| 5,217,255 | 6/1993 | Lin et al. | 281/15.1 |
| 5,336,307 | 8/1994 | Horvat et al. | 106/19 B |
| 5,338,775 | 8/1994 | Matz et al. | 523/161 |
| 5,348,989 | 9/1994 | Shiraishi | 523/161 |
| 5,362,167 | 11/1994 | Loftin | 401/198 |
| 5,389,717 | 2/1995 | Santini et al. | 524/575 |
| 5,661,197 | 8/1997 | Villiger et al. | 523/161 |

FOREIGN PATENT DOCUMENTS

| | | |
|---|---|---|
| 0054832 | 6/1982 | European Pat. Off. . |
| 1-289881 | 11/1989 | Japan . |
| 877402 | 9/1961 | United Kingdom . |
| 914354 | 1/1963 | United Kingdom . |
| 964757 | 7/1964 | United Kingdom . |
| 965627 | 8/1964 | United Kingdom . |
| WO 8301625 | 5/1983 | WIPO . |
| WO 9312175 | 6/1993 | WIPO . |
| WO 9324565 | 12/1993 | WIPO . |

*Primary Examiner*—Marion E. McCamish
*Assistant Examiner*—John J. Guarriello
*Attorney, Agent, or Firm*—Pennie & Edmonds LLP

[57] ABSTRACT

An erasable ink composition contains a water-insoluble polymeric dye obtained by copolymerizing ethylenically unsaturated monomers at least one of which possesses a dye moiety covalently bonded thereto. The ink is intended for use in any of a variety of marking instruments, in particular, a ball-point pen.

15 Claims, No Drawings

ERASABLE INK COMPOSITION CONTAINING A POLYMER DYE OBTAINED FROM ETHYLENIC MONOMERS AND MARKING INSTRUMENT CONTAINING SAME

This is a continuation of application Ser. No. 08/359,568 filed Dec. 20, 1994, now abandoned.

BACKGROUND OF THE INVENTION

This invention relates to an erasable ink composition and to a marking instrument, e.g., a ball-point pen, containing the composition. More particularly, this invention relates to an erasable ink composition containing a water-insoluble polymer dye component, i.e., a polymer possessing a dye moiety covalently bonded thereto.

Numerous erasable ink compositions are known, e.g., those described in U.S. Pat. Nos. 3,834,823, 3,875,105, 3,949,132, 4,097,290, 4,212,676, 4,227,930, 4,256,494, 4,297,260, 4,329,262, 4,329,264, 4,349,639, 4,357,431, 4,367,966, 4,368,076, 4,379,867, 4,389,499, 4,390,646, 4,391,927, 4,407,985, 4,410,643, 4,419,464, 4,441,928, 4,509,982, 4,525,216, 4,557,618, 4,578,117, 4,596,846, 4,606,769, 4,629,748, 4,687,791, 4,721,739, 4,738,725, 4,760,104, 4,786,198, 4,830,670, 4,954,174, 4,960,464, 5,004,763, 5,024,898, 5,037,702, 5,082,495, 5,114,479, 5,120,359, 5,160,369 and 5,217,255. These inks are formulated by mixing a dye (taken herein to also include "pigment", "colorant", "chromophore" and other terms of similar meaning) with a variety of polymer and liquid carrier/solvent combinations thereby forming a flowable dye/polymer matrix. The polymer component is chosen for its film forming properties and its ability to be readily removed from the substrate to which it is applied, e.g., cellulosic paper, through the abrasive action of an eraser. However, a common problem with these erasable ink compositions concerns the residual dye which remains after erasure. Incomplete erasure may be attributed to inadequate removal of the dye/polymer matrix from the paper substrate and/or migration of dye into the pores of the substrate.

SUMMARY OF THE INVENTION

In accordance with the present invention an erasable ink composition is provided which comprises:

a) a water-insoluble polymer dye obtained by copolymerizing a mixture of copolymerizable monomers containing a major amount by weight of at least one colorless ethylenically unsaturated hydrophobic monomer and a minor amount by weight of at least one colored ethylenically unsaturated monomer; and, b) an evaporable liquid carrier for the polymer dye.

Since the dye is covalently bonded to the polymer in the polymer dye component of the foregoing erasable ink composition, there is little opportunity for the dye to separate from the polymer and migrate into a porous substrate. Thus, the erasable ink composition of this invention is apt to leave significantly less residual dye following its erasure than known erasable ink compositions in which the dye is merely physically combined with the polymer component (s).

The term "colorless" as applied to one of the two types of ethylenically unsaturated monomers used in the production of the polymer dye shall be understood as referring to any copolymerizable ethylenically unsaturated compound which lacks a color-imparting dye moiety.

DESCRIPTION OF THE PREFERRED EMBODIMENTS

The polymer dye component of the erasable ink composition of this invention is prepared by copolymerizing a major amount by weight, for example, from about 80 to about 99.5, and preferably from about 90 to about 98, weight percent of at least one colorless ethylenically unsaturated monomer ("colorless monomer") and from about 0.5 to about 20, and preferably from about 2 to about 10, weight percent of at least one ethylenically unsaturated monomer possessing a dye moiety covalently bound thereto ("colored monomer").

Polymer dyes of the type that are useful in the erasable ink composition of this invention are known (but for applications other than erasable ink compositions) or can be prepared by modifying known polymer-forming procedures. Illustrative of such known polymer dyes are those described in U.S. Pat. Nos. 4,763,371, 4,795,794 and 5,188,641 and British Patent Nos. 877,402, 914,354 and 964,757, the contents of which are incorporated by reference herein.

All, or at least most, of the colorless monomer employed in making the polymer dye component of the erasable ink composition herein will be of the hydrophobic type, i.e., the monomer will form a separate phase when 5 g thereof is mixed with 100 g of water. Examples of suitable colorless hydrophobic monomers include monovinylidene aromatic monomers such as styrene, vinyl toluene, t-butyl styrene, chlorostyrene, vinylbenzyl chloride and vinyl pyridine; alkyl esters of $\alpha,\beta$-ethylenically unsaturated acids such as ethyl acrylate, methyl methacrylate, butyl acrylate and 2-ethylhexyl acrylate; unsaturated esters of saturated carboxylic acids such as vinyl acetate, unsaturated halides such as vinyl chloride and vinylidene chloride; unsaturated nitriles such as acrylonitrile; dienes such as butadiene and isoprene; monoolefins such as ethylene, propylene and butene, etc. Of these monomers, the monovinylidene aromatics such as styrene and the alkyl acrylates such as butyl acrylate are preferred.

In addition to the hydrophobic colorless monomer, relatively minor portions, e.g., less than about 10, and preferably less than about 5, weight percent based on total colorless monomer of a water soluble colorless monomer can be used, e.g., an ethylenically unsaturated carboxylic acid or its salt such as acrylic acid or sodium acrylate; methacrylic acid; itaconic acid and maleic acid; an ethylenically unsaturated carboxamide such as acrylamide; vinyl pyrrolidone; hydroxyalkyl acrylates and methacrylates such as hydroxyethyl acrylate, hydroxypropyl acrylate and hydroxyethyl methacrylate; aminoalkyl esters of unsaturated acids such as 2-aminoethyl methacrylate; epoxy functional monomers such as glycidyl methacrylate; sulfoalkyl esters of unsaturated acids such as 2-sulfoethyl methacrylate; ethylenically unsaturated quaternary ammonium compounds such as vinylbenzyl trimethyl ammonium chloride, etc. However, such water-soluble monomers must not be employed in amounts which would render the resulting polymer dye water-soluble. Particularly effective colorless monomer recipes are those containing from about 20 to about 90 weight percent of styrene, from about 10 to about 80 weight percent of an alkyl acrylate such as butyl acrylate and from about 0.01 to about 2 weight percent of an unsaturated carboxylic acid such as acrylic acid.

Among the colored monomers that can be copolymerized with the colorless monomers are those of the general formula

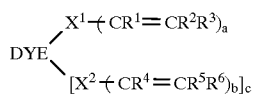

wherein DYE represents a dye residue, $X^1$ and $X^2$ each represents a bridging group covalently linking the dye residue to the ethylenically unsaturated group(s), $R^1$, $R^2$, $R^3$, $R^4$, $R^5$ and $R^6$ each is hydrogen or halogen or an aliphatic or aromatic group of up to about 12 carbon atoms unsubstituted or substituted with one or more halogen atoms and/or one or more hydroxyl, sulfhydryl, carboxylic acid, amino, nitro, alkoxy, alkoxycarbonyl or cyano groups, a is 1 to 5, b is 1 to 5 and c is 0 or 1.

Dye residue DYE can, for example, be derived from a yellow dye such as 1-phenylthio-5-(3'-methacryloylamidothiophenyl)-anthraquinone, 1-(3'-methacryloylamidophenylthio)-anthraquinone or 1-(4'-tertbutylphenylthio)-5-(3'-methacryloylamidophenylthio)-anthraquinone; a blue dye such as 4-amino-1,8-dihydroxy-2,7-diisobutyl-5-methacryloylamidoanthraquinone, 4-amino-1,8-dihydroxy-2,7-diisopropyl-5-methacryloylamidoanthraquinone or 4-amino-1,5-dihydroxy-2,6-diisobutyl-8-methacryloylamidoanthraquinone; a cyan dye such as N-(3'-methacryloylamidopropyl) 1,4-diaminoanthraquinone-2,3-dicarboximide, N-(6'-methacryloylamidohexyl) 1,4-diaminoanthraquinone-2,3-dicarboximide or N-(6'-methacryloylhexyl) 1,4-diaminoanthraquinone-2,3-dicarboximide; a purple dye such as N-(3'-methacryloylpropyl) 1-amino-4-methacryloylamido-anthraquinone-2,3-dicarboximide; a magenta dye such as 1-amino-4-hydroxy-2-(N-3'-methacryloylpropylamino)-anthraquinone, 1-amino-4-hydroxy-2-(N-3'-methacryloylhexylamino)-anthraquinone, 1-amino-4-hydroxy-2-(N-3'-methacryloylamidohexylamino)-anthraquinone or 1-amino-4-hydroxy-2-(3'-methacryloylhexylthio)-anthraquinone; or a red dye such as 1,5-dihydroxy-2,6-diisobutyl-4-(3'-methacryloylamidophenylthio)-anthraquinone, 1,8-dihydroxy-2,7-diisobutyl-4-(3'-methacryloylamidophenylthio)-anthraquinone, 1,5-dihydroxy-2,6-diisobutyl-4-methacryloylamidoanthraquinone, 1,8-dihydroxy-2-7-diisobutyl-4-methacryloylamidoanthraquinone, 1,8-dihydroxy-2,7-diisopropyl-4-methacryloylamido-anthraquinone or 1,4,5-triphenylthio-8-(3'-methacryloylamido-phenylthio)-anthraquinone.

Preferred bridging groups $X^1$ and $X^2$ include the groups —NHCO—, —OCNH—, -(OC)$_2$N—, —NHR$^7$OOC—and —N(R$^7$OOC)$_2$ in which $R^7$ is an aliphatic group of up to about 12 carbon atoms, and (—X$^3$R$^8$(OOC)$_d$ in which $X^3$ is —O—, —COO— or —NH—, $R^8$ is an aliphatic group of up to about 12 carbon atoms, optionally containing at least one ester linkage, and d is equal to a in the case of bridging group $X^1$ and to c in the case of bridging group $X^2$. Specific $X^1$ and $X^2$ bridging groups include —NHCH$_2$CH$_2$OOC—, —N(CH$_2$CH$_2$OOC)$_2$, —COOC(C$_2$H$_5$) (CH$_2$OOC)$_2$, —OCH$_2$COOC(C$_2$H$_5$) (CH$_2$OOC)$_2$ and

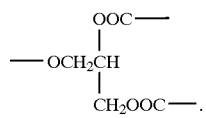

Preferred colored monomers are those in which $R^1$ and $R^2$ each is hydrogen, halogen, lower alkyl, alkoxycarbonyl or cyano, and more preferably hydrogen or methyl, and $R^2$, $R^3$, $R^5$ and $R^6$ each is hydrogen. Specific colored monomers include the following:

1,4-bis-(2-acryloyloxyethylamino)anthraquinone
1,4-bis-(2-acryloyloxy-1-ethylethylamino)anthraquinone
1,4-bis-[4-(2-acryloyloxyethoxy)phenylamino] anthraquinone
1,4-bis-(2-acryloyloxyethylamino)-5-hydroxy-8-nitro-anthraquinone
1,5-bis-(2-acryloyloxyethylamino)anthraquinone
2-(4-acryloyloxyphenyl)-4-acryloylamino-1-aminoanthraquinone
1,4-bis-(4-acryloyloxymethyl-2,6-methylanilino) anthraquinone
1-[2-(1,1-acryloyloxymethyl)propoxycarbonylethylamino]-4-amino-8-hydroxy-5-nitroanthraquinone
1,8-bis-(2-acryloyloxyethylamino)-4,6-dihydroxyanthraquinone
1,4-bis-(2-acryloyloxyethylamino)-5,8-dihydroxyanthraquinone
1,5-bis-(2-acryloyloxyethylamino)-4,8-dihydroxyanthraquinone
1,8-bis-(2-acryloyloxyethylamino)anthraquinone
4-acryloylamino-2-(2-acryloyloxyethoxy)-1-aminoanthraquinone
1,5-bis-(2-acryloyloxyethylamino)naphtha-4,8-diquinone
1,5-bis-(2-acryloyloxyethylamino)dibromonaphtha-4,8-diquinone
2-[4-N:N-bis-(2-acryloyloxyethylamino)phenyl]-6-methoxy-3-methylbenzthiazoluine methosulphate
3-[4-N:N-bis-(2-acryloyloxyethylamino)phenylazo]-2,4-dimethylthiazolium methosulphate
Copper phthalocyanine- $(SO_3H)_2$ $(SO_2NCH_2CH_2OCOCH=CH_2)_2$
Copper phthalocyanine- $(CH_2OCOCH=CH_2)_3$
4-(2,2-bis-acryloyloxymethylethoxy)-N-(2,4-dinitrophenyl) aniline
1-[4-N:N-bis-(2-acryloyloxyethyl)aminophenyl]-2,2-dicyanoethylene
3-[N:N-bis(2-acryloyloxyethyl)carbamoyl]-1-(2-chloro-s-trifluoromethyl)phenylazo-2-hydroxynaphthalene
N:N-bis-(2-acryloyloxyethyl)-3-acetylamino-4-(2-chloro-4-methylsulphonyl)phenylazoaniline
2-[4-N:N-bis-(2-acryloyloxyethyl)amino]-2-methylphenylazo-6-nitrobenzthiazole
3-[N:N-bis-(2-acryloyloxyethyl)carbamoyl]-1-(2-nitro) phenylazo-2-hydroxynaphthalene
5-[4-N:N-bis-(2-acryloyloxyethyl)aminophenylazo]-3-2-[(1,1-bis-acryloyloxymethyl)propoxycarbonyl]-ethylthio-1,2,4-thiadiazole
N,N-bis-(2-acryloyloxyethyl)-4-(2,6-dichloro-4-nitro) phenylazoaniline
2,9-bis-(2-acryloxyethylamino)-6,13-dichlorotriphendioxazine These and other useful colored monomers are described in U.S. Pat. No. 4,763,371 the contents of which are incorporated by reference herein. Still other useful colored monomers are described in U.S. Pat. Nos. 4,795,794 and 5,188,641, the contents of which are also incorporated by reference herein.

The copolymerization of the colorless monomer(s) and the colored monomer(s) can be achieved employing any of a variety of known and conventional polymerization procedures. Emulsion polymerization is a preferred procedure since it provides an aqueous dispersion of polymer dye particles that can be used directly as the erasable ink composition of this invention with or without the addition of one or more optional ingredients such as those mentioned below.

Emulsion polymerization conditions are generally conventional free-radical type polymerizations carried out in the presence of a radical initiator such as a peroxygen compound, an azo catalyst, ultraviolet light, and the like. Preferably, such polymerization is carried out in the presence of a water-soluble peroxygen compound at temperatures in the range from about 50° to 90° C. The emulsion is generally agitated during the polymerization period in order to maintain adequate feed transfer. The concentration is normally in the range from about 0.005 to about 8, and preferably from about 0.01 to about 5, weight percent based on the total monomer. Examples of suitable catalysts include inorganic persulfate compounds such as sodium persulfate, potassium persulfate and ammonium persulfate; peroxides such as hydrogen peroxide, t-butylhydroperoxide, dibenzoyl peroxide and dilauroyl peroxide; azo catalysts such as azobisisobutyronitrile, and other common free radical generating compounds. Also suitable are various forms of free radical generating radiation means such as ultraviolet radiation, electron beam radiation and gamma radiation. Alternatively, a redox catalyst composition can be employed wherein the polymerization temperature ranges from about 25° to about 80° C. Exemplary redox catalyst compositions include a peroxygen compound as described hereinbefore, preferably potassium persulfate or t-butyl hydroperoxide, and a reducing component such as sodium metabisulfite or sodium formaldehyde hydrosulfite. It is also suitable to employ various chain transfer agents such a mercaptans, e.g., dodecyl mercaptan; dialkyl xanthogen disulfides; diaryl disulfides, and the like.

Following emulsion polymerization, the emulsion polymerizate can be withdrawn from the polymerization vessel and (1) the emulsion employed as is, or in, the erasable ink or (2) the unreacted monomer and other volatiles can be removed to form a concentrated emulsion which is then used as, or in, the erasable ink or (3) the polymer dye particulates can be separated from the aqueous continuous phase of the dispersion by conventional means such as drying under vacuum or spray drying.

The polymer dye component of the erasable ink composition of this invention will generally possess an average particle size of from about 25 to about 1000 nanometers and preferably from about 50 to about 250 nanometers. Where the polymer dye component is not obtained in a particle size which is suitable for use in the erasable ink composition herein, it may be reduced to such size by any known or conventional method for obtaining polymer powders, for example, by grinding, milling, or by any of several "hot water" emulsification processes for producing polymer powders such as that described in U.S. Pat. No. 3,586,654, the contents of which are incorporated by reference herein.

The fully formulated erasable ink composition, i.e., the polymer dye component in admixture with the evaporable liquid carrier component and any optional component(s), can possess a relatively low viscosity, e.g., from about 1 to about 80,000 centipoises and preferably from about 3 to about 30,000 centipoises when water is the carrier, or a relatively high viscosity, e.g., at least about 100,000 centipoises and preferably at least about 500,000 centipoises when the carrier is an organic solvent or mixture of organic solvents which swell or dissolve the polymer dye. It will, of course, be recognized that when the erasable ink composition possesses such a high viscosity that it no longer readily flows solely under the influence of gravity, it becomes necessary to provide a pressurized delivery system for any marking instrument containing the ink.

To improve or optimize one or more functional characteristics of the erasable ink composition, one or more optional components can be added in the usual amounts to the composition, e.g., one or more natural and/or synthetic polymer latices, rheological modifiers, suspension agents, humectants, emulsifiers, surfactants, plasticizers, spreading agents, drying agents, release agents, parting agents, preservatives, antimicrobial agents, anticorrosion agents, antioxidants, coalescing aids, and the like.

With or without the addition of any optional component (s), the erasable ink composition when applied to a substrate, and particularly a porous substrate such as a cellulosic paper, and upon drying thereon is (1) sufficiently adherent to the substrate as to resist flaking therefrom and (2) substantially erasable. Thus, the dry erasable ink composition of this invention applied to paper and evaluated by the adherency test described infra will generally exhibit less than about 30 weight percent flaking, preferably less than about 20 weight percent flaking and even more preferably less than about 10 weight percent flaking. Erasability values delta $E^*ab$ of the erasable ink composition herein as measured by ASTM D-2244-89 will generally be on the order of less than about 4.0, preferably less than about 3.5 and even more preferably less than about 3.0.

It is preferred that the erasable ink composition herein when evaluated by the smearability test described infra exhibit a subjectively determined low level of smear, e.g., a smear value of 2 or less and preferably a smear value of 1 (i.e., essentially no smearing).

The erasable ink composition of this invention is intended to be used in any of a variety of marking instruments and in particular, a ball-point pen.

The following examples are illustrative of the erasable ink composition of this invention.

EXAMPLES ILLUSTRATING THE PREPARATION OF ETHLENICALLY UNSATURATED DYE MONOMERS

Example 1

Dimethyl Meta-Isopropenyl benzyl isocyanate (Cytec Ind./American Cyanamid Co.) (7.88 g) and monohydroxyl azo red colorant (BIC Corp.) (13.3 g) were dissolved in toluene (200 mL). To the solution, dibutyltindilaurate catalyst (10 drops) was added and the solution was refluxed for 12 hours. The toluene was removed and the resulting ethylenically unsaturated dye monomer was recrystallized in ethanol to provide a red-colored dye monomer.

Example 2

Dimethyl Meta-Isopropenyl benzyl isocyanate (Cytec Ind./American Cyanamid Co.) (7.88 g) and monohydroxyl azo red colorant (BIC Corp.) (13.3 g) were dissolved in toluene (200 mL). To the solution, dibutyltindilaurate catalyst (10 drops) was added and the solution was refluxed for 12 hours. The toluene was removed and the resulting ethylenically unsaturated dye monomer was recrystallized in ethanol to provide a red-colored dye monomer.

EXAMPLES ILLUSTRATING THE PREPARATION OF POLYMER DYE

Example 3

The following ingredients were introduced to a reaction kettle under stirring at about 75° C.:

| Ingredient | Amount (g) |
| --- | --- |
| Water | 238.3 |
| Alipal EP-120 (Anionic surfactant from Rhône-Poulenc) | 3.5 |
| Sipo DS-4 (Anionic surfactant from Rhône-Poulenc) | 3.5 |

A pre-emulsion was formed by stirring the following ingredients together in a separate container at room temperature for 30 minutes:

| Ingredient | Amount (g) |
|---|---|
| Water | 190.7 |
| Alipal EP-120 (Anionic surfactant from Rhône-Poulenc) | 8.3 |
| Sipo DS-4 (Anionic surfactant from Rhône-Poulenc) | 3.2 |
| Butyl acrylate | 162.1 |
| 2-Ethyl 1 hexyl acrylate | 162.1 |
| Acrylonitrile | 42.9 |
| Example 1 (red-colored dye monomer) | 12.6 |

The pre-emulsion (30 g) was added to the reaction kettle at about 75° C. and stirred for approximately 15 minutes. A solution of azo initiator (VA-61 from WAKO Chemicals) (0.03 g) in water (6.1 g) was added to the reaction kettle to initiate emulsion polymerization. The contents of the reaction kettle were stirred for approximately 15 minutes at about 75° C. The remaining portion of the pre-emulsion was introduced to an addition funnel and added dropwise to the reaction kettle over a 3 hour period at about 80° C. Similarly, an initiator solution formed by admixing water (48.3 g), Alipal EP-120 (anionic surfactant from Rhône-Poulenc) (1.9 g) and azo initiator (VA-61 from WAKO Chemicals) (0.5 g) was then placed in the addition funnel and added dropwise to the reaction kettle over the three hour period while maintaining the reaction kettle at about 80° C. After all additions were complete, the temperature of the reaction kettle was maintained at 80° C. for approximately 1 hour. Thereafter, residual monomer remaining in the emulsion polymerizate was scavenged with four separate scavenger solutions of sodium formaldehyde sulfoxylate (Hydro AWC from Henkel) (0.15 g) in water (10 g) and a 70% solution of t-butylhydroperoxide (0.30 g) in water (5 g). The resulting emulsion polymerizate was neutralized to a slightly basic pH, i.e., from about 7.5 to about 8.5, utilizing Aqua Ammonia 28%. The emulsion polymerizate contained approximately 39.4 weight percent solids. The color of the resulting polymer dye (dry) was red. The average particle size of the polymer dye was about 120 nanometers. The calculated $T_g$ for the polymer dye was approximately −61° C.

Example 4

The following ingredients were placed in a reaction bottle and stirred:

| Ingredient | Amount (g) |
|---|---|
| Water | 58.00 |
| Rosin Soap | 2.00 |
| $Na_3PO_4.10H_2O$ | 0.17 |
| HEMA (Fe(II) complex of EDTA from Hampshire) | 0.02 |
| Sodium formaldehyde sulfoxyl | 0.03 |

Thereafter, the following ingredients were placed in the reaction bottle containing the above-identified ingredients and the bottle was capped:

| Ingredient | Amount (g) |
|---|---|
| Styrene | 9.00 |
| Dodecyl mercaptan | 0.07 |
| Butadiene (liquified) | 25.00 |
| Example 2 (red-colored monomer dye) | 1.00 |

A solution of cumene hydroperoxide (0.03 g) in styrene (1.00 g) was then added to the reaction bottle via syringe. The reaction bottle was agitated for about 12 to about 24 hours at approximately 15° C. to provide an emulsion polymerizate containing approximately 39.4 weight percent solids. The color of the resulting polymer dye (dry) was red. The calculated $T_g$ for the polymer dye was approximately −46° C.

The polymer dyes of Examples 3–4 can be directly employed as erasable ink compositions or be combined with one or more optional components as disclosed hereinabove prior to being employed as erasable ink compositions.

To further illustrate the erasable ink composition of this invention, the polymer dye of Example 3 was combined with propylene glycol to provide an erasable ink composition (Example 5) containing 90 weight percent polymer dye obtained from Example 3 and 10 weight percent propylene glycol.

The properties of the erasable ink composition of Example 5 were evaluated. In particular, the color intensity, viscosity, adherency, erasability and smearability of the erasable ink composition were evaluated.

Color intensity was evaluated by a subjective visual evaluation of script.

Adherency was determined by performing a drawdown on preweighed Linetta drawdown paper with approximately 0.8 g of sample (spread over an area of ¼ inch×1½ inch) and drawn down with a #6 cater-bar. The sample was allowed to dry completely (approximately 5 minutes at room temperature) and the paper was weighed again. The paper was then crumpled by hand, any flakes were blown off and the paper was reweighed. This test was also performed with erasable ink made according to U.S. Pat. Nos. 5,120,359 and 5,203,913 (Comparative Example 1).

Erasability was determined by performing an actual "WRITE-TEST" (similar to a spirograph wherein ink is applied in a circular arrangement on paper with some cross-over of ink occurring) with ball-point pens containing the erasable ink composition of Example 5 and the following commercially available pens which contain erasable ink:

| Pen | Ink Color | Comparative Example |
|---|---|---|
| Erasermate | Blue | 2 |
| Erasermate 2 | Blue | 3 |
| Scripto | Blue | 4 |
| Scripto | Red | 5 |

The "WRITE-TEST" write-downs were then erased and reflectance measurements were performed on the erased portion of the paper versus an unblemished/untouched portion of the paper. A quantitative value was then obtained, i.e., delta E*ab from CIE lab measurement (described in ASTM D-2244-89). Lower values indicate more complete erasures.

Smearability was subjectively evaluated for the erasable ink composition of Example 5 and Comparative Examples 2–5 1–2 seconds after writing by attempting to smudge the ink with one's fingers. A smear value of 1 represents essentially no smearing and a smear value of 5 represents such a degree of smearing that legibility of the writing is significantly impaired.

Table I below presents the properties of the erasable ink compositions:

TABLE I

| Example | Color Intensity | Viscosity (cps) | Adherency (Wt. % of Dried Ink Composition Retained on the Paper) | Erasability Value (delta E*ab) | Smear Value |
|---|---|---|---|---|---|
| 5 | Approx. 50% of Comparative Examples | ~2–10 | 100% | 1.06 | 1 |
| Comp. Ex. 1 | — | — | 63% | — | — |
| Comp. Ex. 2 | — | — | — | 3.3 | 2 |
| Comp. Ex. 3 | — | — | — | 3.63 | 2 |
| Comp. Ex. 4 | — | — | — | 5.38 | 3 |
| Comp. Ex. 5 | — | — | — | — | 4 |

As can be seen from the data presented in Table I, the erasable ink composition of Example 5 exhibited superior adherency, erasability and resistance to smear relative to the comparative examples. The erasable ink composition of this invention is highly adherent to substrates as to resist flaking therefrom, substantially erasable and substantially non-smearing.

While this invention has been disclosed herein in connection with certain embodiments and certain procedural details, it is clear that changes, modifications or equivalents can be used by those skilled in the art. Accordingly, such changes within the principles of this invention are intended to be included within the scope of the claims below.

What is claimed is:

1. An erasable ink composition which comprises:
   a) a water-insoluble polymer dye obtained by copolymerizing a mixture of copolymerizable monomers containing a major amount by weight of at least one colorless ethylenically unsaturated hydrophobic monomer and a minor amount of at least one colored ethylenically unsaturated monomer;
   b) an evaporable liquid carrier for the polymer dye, the erasable ink composition when applied to a substrate and upon drying thereon exhibiting less than about 30 weight percent flaking based on the weight of the dried ink and an erasability value delta E*ab of less than about 4.0.

2. The erasable ink composition of claim 1 exhibiting less than about 20 weight percent flaking based on the weight of the dried ink and an erasability value delta E*ab of less than about 3.5.

3. The erasable ink composition of claim 1 exhibiting less than about 10 weight percent flaking based on the weight of the dried ink and an erasability value delta E*ab of less than about 3.0.

4. The erasable ink composition of claim 1 wherein the carrier is an aqueous liquid, the polymer dye being dispersed therein.

5. The erasable ink composition of claim 4 wherein the composition possesses a viscosity of from about 1 to about 80,000 centipoises.

6. The erasable ink composition of claim 5 wherein the composition possesses a viscosity of from about 3 to about 30,000 centipoises.

7. The erasable ink composition of claim 1 wherein the carrier is an organic liquid, the polymer being dispersed, dissolved or swollen therein.

8. The erasable ink composition of claim 7 wherein the composition possesses a viscosity of at least about 100,000 centipoises.

9. The erasable ink composition of claim 7 wherein the composition possesses a viscosity of at least about 500,000 centipoises.

10. The erasable ink of claim 1 wherein the colorless monomer is a hydrophobic monomer selected from the group consisting of vinyl aromatic, alkyl ester of α,β-ethylenically unsaturated acid, unsaturated ester of a saturated carboxylic acid, unsaturated halide, unsaturated nitrile, diene and monoolefin.

11. The erasable ink composition of claim 1 wherein the colored monomer is an ethylenically unsaturated compound of the general formula $$DYE \begin{cases} X^1 \text{--} (CR^1 = CR^2R^3)_a \\ [X^2 \text{--} (CR^4 = CR^5R^6)_b]_c \end{cases}$$

wherein DYE represents a dye residue, $X^1$ and $X^2$ each represents a bridging group covalently linking the dye residue to the ethylenically unsaturated group(s), $R^1$, $R^2$, $R^3$, $R^4$, $R^5$ and $R^6$ each is hydrogen or halogen or an aliphatic or aromatic group of up to about 12 carbon atoms, unsubstituted or substituted with one or more halogen atoms and/or one or more hydroxyl, sulfhydryl, carboxylic acid, amino, nitro, alkoxy, alkoxycarbonyl or cyano groups, a is 1 to 5, b is 1 to 5 and c is 0 or 1.

12. The erasable ink composition of claim 9 wherein the colorless monomer is a hydrophobic monomer selected from the group consisting of vinyl aromatic, alkyl ester of α,β-ethylenically unsaturated acid, unsaturated ester of a saturated carboxylic acid, unsaturated halide, unsaturated nitrile, diene and monoolefin.

13. The erasable ink composition of claim 1 further comprising at least one component selected from the group consisting of natural latices, synthetic latices, rheological modifiers, suspension agents, humectants, emulsifiers, surfactants, plasticizers, spreading agents, drying agents, release agents, parting agents, preservative, antimicrobial agents, anticorrosion agents, antioxidants and coalescing aids.

14. A marking instrument containing the erasable ink composition of claim 1.

15. The marking instrument of claim 14 which is a ball-point pen.

* * * * *